United States Patent
Juengst et al.

Patent Number: 5,424,608
Date of Patent: Jun. 13, 1995

[54] HIGH-PRESSURE DISCHARGE LAMP WITH CERAMIC DISCHARGE VESSEL

[75] Inventors: Stefan Juengst, Zorneding; Hartmuth Bastian, Feuchtwangen, both of Germany

[73] Assignee: Patent-Treuhand-Gesellschaft F. Elektrische Gluehlampen mbH, Munich, Germany

[21] Appl. No.: 49,559

[22] Filed: Apr. 19, 1993

[30] Foreign Application Priority Data

May 18, 1992 [DE] Germany .................. 9206727 U

[51] Int. Cl.$^6$ .................... H01J 17/18; H01J 61/36
[52] U.S. Cl. .................... 313/623; 313/624; 313/625
[58] Field of Search .................... 313/623, 624, 625

[56] References Cited

U.S. PATENT DOCUMENTS

| | | | |
|---|---|---|---|
| 3,564,328 | 2/1971 | Bagley et al. | 313/625 |
| 3,892,993 | 7/1975 | Timmermans | 313/623 |
| 4,501,799 | 2/1985 | Driessen et al. | |
| 4,539,511 | 9/1985 | Denbigh et al. | 313/624 |
| 4,740,403 | 4/1988 | Oomen et al. | |
| 4,959,588 | 9/1990 | Vida et al. | 313/623 |

FOREIGN PATENT DOCUMENTS

| | | |
|---|---|---|
| 0472100 | 2/1992 | European Pat. Off. |
| 528427 | 2/1993 | European Pat. Off. ........ 313/623 |
| 528428 | 2/1993 | European Pat. Off. ........ 313/623 |
| 1471379 | 12/1968 | Germany . |
| 9112690 U | 5/1992 | Germany . |
| 50-38267 | 12/1975 | Japan ........ 313/623 |
| 0304438 | 1/1991 | Japan ........ 313/623 |
| 1465212 | 2/1977 | United Kingdom . |

Primary Examiner—Donald J. Yusko
Assistant Examiner—Matthew J. Esserman
Attorney, Agent, or Firm—Frishauf, Holtz, Goodman & Woodward

[57] ABSTRACT

To protect a niobium tube (9) forming a current supply lead through a through-opening (14) in an end plug (10) in a ceramic discharge vessel against attack by halides or condensed sodium, the through-opening is formed in two portions, of different diameters. The outer portion (16), remote from the discharge vessel, has a diameter which is matched to the diameter of the tube (9), leaving only a capillary between the plug opening and the tube; the second, inner portion (17) is narrower than the first one, that is, outer portion, and surrounds the shaft of the electrode by a sufficient distance to permit expansion of the electrode, typically of tungsten, under operating conditions, without cracking the plug by forced engagement with the wall of the inner portion (17) of the aperture. A sealing glass, melt-sealed into the capillary of the outer portion, seals the niobium tube. Preferably, the niobium tube terminates inwardly in a dome-shaped end (20) seated in a similarly shaped cavity forming the transition between the two diameters of the through-opening, and also providing a capillary space for ingress of molten sealing glass. The inner diameter of the outer portion (16) of the through-opening differs, preferably, by at most about 0.05 mm from the outside diameter of the tube (9), whereas the diameter of the inner portion (17) of the through-opening (14) differs by at least 0.5 mm from the diameter of the electrode shaft.

20 Claims, 2 Drawing Sheets

HIGH-PRESSURE DISCHARGE LAMP WITH CERAMIC DISCHARGE VESSEL

Reference to related patents, the disclosures of which are hereby incorporated by reference:
U.S. Pat. No. 4,501,799, Driessen et al (to which European Published Application 60 582 corresponds);
U.S. Pat. No. 4,740,403, Oomen et al (to which European Patent 230,080 corresponds);
Reference to related publication:
British Patent 1,465,212, Rigden.

FIELD OF THE INVENTION

The present invention relates to a high-pressure discharge lamp, and more particularly to such a discharge lamp which has a discharge vessel made of ceramic material, typically aluminum oxide, and especially to such a lamp having improved end plugs for the vessel through which electrical current supply elements extend to supply energy, and mechanically support the discharge electrodes within the vessel.

BACKGROUND

Various types of high-pressure discharge lamps use ceramic discharge vessels. These discharge vessels can be used with sodium high-pressure lamps, as well as with metal-halide discharge lamps. The color rendition and color indices of the emitted light can be improved when using a ceramic discharge vessel over that of a glass vessel, since the ceramic material permits a higher operating temperature with respect to a vessel made of glass, typically of quartz glass. Lamps of this type may have power ratings for example of between 100 to 250 W.

Problems arise in the lead-through arrangements for electrical energy to the electrodes in the discharge vessel. Various through-melting technologies are known, primarily from the technology developed for sodium high-pressure discharge lamps. Tubular lead-throughs made of niobium or tantalum are frequently used. These lead-throughs are then melt-sealed by a sealing glass in a ceramic end plug which is fitted into openings formed in the end of the discharge vessel. An arrangement of this type is described, for example, in British Patent 1,465,212, Rigden.

Niobium as well as tantalum have thermal coefficients of expansion which are similar to that of the ceramic used. The thermal coefficient of expansion is about $8 \times 10^{-6}/°K$.

The known sealing arrangements cannot be used, unfortunately, for metal-halide lamps intended to have a long lifetime, and designed for good color rendition, since the metal-halide fill has the tendency to corrode the niobium lead-through as well as the sealing glass used to seal the niobium tube through the ceramic plug. Sodium high-pressure lamps, likewise, after extended use attack the lead-through, and hence the lifetime of the lamp is limited by attack of condensed sodium on the lead-through arrangement.

Various types of sealing glasses have been used, for example calcium aluminate glass (see the aforementioned British Patent 1,465,212, Rigden) as well as special sealing glasses made of materials which are known by themselves, such as mixtures of aluminum and earth alkali oxides. The referenced U.S. Pat. Nos. 4,501,799, Driessen et al, and 4,740,403, Oomen et al, describe materials which are particularly resistant to attack by halides.

THE INVENTION

It is an object to provide a high-pressure discharge lamp which has a ceramic discharge vessel and an ionizable fill therein, which has a long lifetime, improved color rendition over prior art lamps, higher light output, and retention of the light output as well as the color rendition over an extended lifetime of the lamp.

Briefly, the lamp ends are closed off with plugs. At least one of the plugs has an aperture which is stepped in two parts. The diameter of the plug portion adjacent the outer end, which may be termed the outer portion thereof, is dimensioned to match the outside diameter of the lead-through tube. The diameter of the portion adjacent the inner end of the plug is smaller, and dimensioned to permit free passage of an electrode stem therethrough, that is, to permit passage with sufficient clearance so that the stem can expand under operating conditions and increased temperature. Typically, the stem is made of tungsten, and the tubular connecting leads of niobium or tantalum. A sealing glass is used to melt-seal the tube into the outer portion of the aperture.

The lead-through technology well known in sodium high-pressure discharge lamps cannot generally be carried over to lamps having ceramic discharge vessels with metal-halide fills. A number of additional problems must be solved all at once:
(1) the halides attack the sealing glass;
(2) the halides attack the lead-through metal tubes; and
(3) there are only very few metals known which have thermal coefficients of expansion matching, roughly at least, that of the surrounding ceramic.

The metals which are suitable and meet the requirement (3) are, especially, niobium and tantalum; however, just those metals are particularly corroded by halides or by a sodium condensate, respectively.

In accordance with the present invention, the lead-through metals niobium and tantalum which have the requisite thermal coefficient of expansion are effectively protected against attack by the halides, or a sodium condensate, respectively, and, further, the sealing glass is likewise so protected.

The protection is obtained, in accordance with the present invention, by the specific arrangement in which the niobium or tantalum metal tubes are fitted in the plug. In accordance with prior art, the plug has a through-bore of constant diameter, so that, even if the tube is not carried to the inner end of the opening, the tube is subject to attack by the aggressive fill within the bulb. This attack will occur at least at the end portion of the tube. In accordance with the present invention, this attack is minimized by making the aperture or through-bore in the plug in two parts of different diameter, which are stepped and adjoin each other with the larger diameter accepting the tube at the outside of the plug and the narrow one accepting the stem for the electrode interiorly of the vessel, or at the inner side of the plug. The diameter of the aperture at the inner side or discharge side of the plug is so selected that it can readily accept the electrode shaft which is made, customarily, of a material which is particularly high temperature resistant, usually tungsten. The thermal coefficient of expansion of tungsten, however, deviates substantially from that of the ceramic material of the plug.

The end portion of the connecting tube, which faces the discharge, is better protected by the material of the plug itself as the diameter of the opening becomes constricted. This constriction forms a shoulder or abutment surface which, automatically, also determines the spacing of the electrodes from each other, as the plugs are introduced into the discharge vessel.

In accordance with a preferred feature of the invention, the dimension of the outer portion of the aperture or opening and of the outside diameter of the connecting tube are so selected that the tube fits snugly into the opening leaving only a capillary space, into which the melt glass or sealing glass can flow upon melt-sealing the tube into the plug. In contrast, however, the diameter of the narrowed portion is so selected that the stem or shaft of the electrode, and possibly a region of increased thickness at the inner end thereof, can just be passed therethrough. A particularly small diameter of the inner narrowed portion can be obtained by inserting the electrode system in such a manner that the electrode stem or shaft is smooth to the outer end, without any thickening at all; the thickening is applied only afterwards, that is, after the electrode has been passed through the opening in the plug. This thickening may be a few windings of material around the end of the electrode, or may be a ball, which can be formed, for example, by melting-back the electrode tip. This melt-back can be obtained, for example, by application of an excess current. Care must be taken that the diameter of the narrowed, inner portion is larger than the diameter of the electrode shaft, or the inner connection to the electrode, respectively, so that no capillary effect in the region of the narrowed portion will be obtained. This is necessary since the electrode shaft customarily is made of high temperature resistant metal. Since the usual metal used, that is tungsten, has a thermal coefficient of expansion which deviates substantially from the ceramic material of the plug, glass melt which, in case of capillary effect surrounding the electrode shaft or stem, might wet the narrowed region. Since the thermal coefficients of expansion do not match, however, the high thermal loading of the lamp, particularly upon intermittent use, would result in the formation of fissures or cracks in the sealing glass and, eventually, also in the plug, leading to leakage and, then, failure of the lamp.

In accordance with a preferred feature of the invention, the diameter of the tube is so made that it is fitted to the outer bore portion with less than 0.05 mm clearance, in order to provide for the capillary effect. To prevent capillary flow of the sealing glass, however, the narrowed or inner portion of the aperture should have a larger clearance to the electrode of at least 0.3, and preferably at least 0.5 mm. The length of the outer or wider portion of the bore, preferably, is about two-thirds of the axial height or length of the plug in order to provide for a reliable seat of the tube in the bore and a sufficiently long sealing path for the tube in the bore and to securely seat the tube deeply within the plug.

In accordance with a particularly preferred feature of the invention, the tube is formed with a dome-shaped end portion, which is roughly hemispherical. The electrode shaft or stem is butt-welded on the apex of this hemispherical end portion of the tube. The hemispherical end portion can be obtained by melting an open end of the tube which collapses to form a closed end having the shape of a hemisphere or half-ball. The stepped portion of the aperture within the plug is rounded to receive the essentially hemispherical or domed end of the tube so that the space between the metal of the connecting tube and of the ceramic plug is about the same at all facing surfaces. This arrangement has the substantial advantage that the capillary which will form around the tube is extended, effectively, to the discharge end of the connecting tube, that is, to the inner end thereof.

The arrangement with the dome-shaped end permits complete coverage of the tube and the end with sealing glass, and especially effectively protects the connecting tube from attack of the aggressive fill. The concave rounding at the transition from the wider outer aperture portion to the narrowed or constricted inner portion of the bore should well match the hemispherically or dome-shaped end of the lead or connecting tube.

It has been found that specific spacers or locating accessories to maintain the capillary gap and the electrode spacing are not necessary. The electrode system formed of the niobium tube, the electrode shaft or stem and the tip thereof positions itself automatically. The electrode spacing, which should be precise for operation of the lamp also likewise is maintained automatically. The width of the capillary gap is obtained by the natural roughness or unevenness of the materials adjacent each other.

In accordance with another preferred feature of the invention, a niobium tube is used which, before being melt-sealed in the plug, is coated with a layer of aluminum oxide $Al_2O_3$, which has a thickness of between about 0.1 to 0.2 mm. Of course, the diameter of the outer bore or aperture in the plug should then be correspondingly enlarged. This ceramic coating has two advantages: it additionally protects the niobium tube with respect to the fill, since the fill must diffuse through the ceramic tube before it can attack the metal. This increases the lifetime of the lamp. Additionally, the $Al_2O_3$ layer has a porous structure, which improves the wetting capability of the sealing glass.

The $Al_2O_3$ layer, thus, indirectly improves the diffusion of the sealing glass in the capillary gap, by improving the reliability of complete and uniform wetting of the tube by the sealing glass, substantially reducing rejects occurring in manufacture. The coating of the $Al_2O_3$ can be easily effected by flame-spraying processes.

In accordance with a further preferred improvement, the coating can be improved by adding yttrium oxide, $Y_2O_3$. For example, first a pure $Al_2O_3$ layer is applied and, then, an additional layer of $Y_2O_3$ thereover. Alternatively, a mixture of $Al_2O_3/Y_2O_3$, in a relative proportion of 1:1 to 1:3 can be applied, again for example by flame-spraying. The tube, precoated with $Al_2O_3$, can be dipped into a suspension of $Y_2O_3$. The coated tube is then fired at about 2000° C., or, respectively, glazed. The result will be a crystalline layer with a glassy proportion. Other metal oxides may also be used for coating.

The tube with the mixed coating, or with the two coatings, respectively, is then sintered for some minutes at a temperature of at least 1800° C., under vacuum, or in a protective gas. The result will be a homogeneous layer which is highly halide-resistant, formed of an $Al_2O_3/Y_2O_3$ mixture. The conditions of cooling of this mixed coating can determine the characteristics. If the cooling is carried out rapidly, the mixed coating will be quite glassy, and will have the effect of a high-temperature enamel. If cooling is permitted to be slow, the coating will be primarily of fine crystalline nature.

The electrical connection or connecting lead tubes, so pretreated, are then fitted into the outer portion of the opening of the plug. A ring of sealing glass is fitted on the tube, and the plug, with the electrode system fitted thereon, is heated until the sealing glass melts and runs into the capillaries in the region of the outer portion of the aperture. The result will be a gas-tight melt seal.

The sealing glass used can be of any well-known metal oxide mixture. When using the plugs in metal-halide lamps, the sealing glass, in contrast to sodium high-pressure lamps, must be halide-resistant.

DRAWINGS

DETAILED DESCRIPTION

Figure 1:
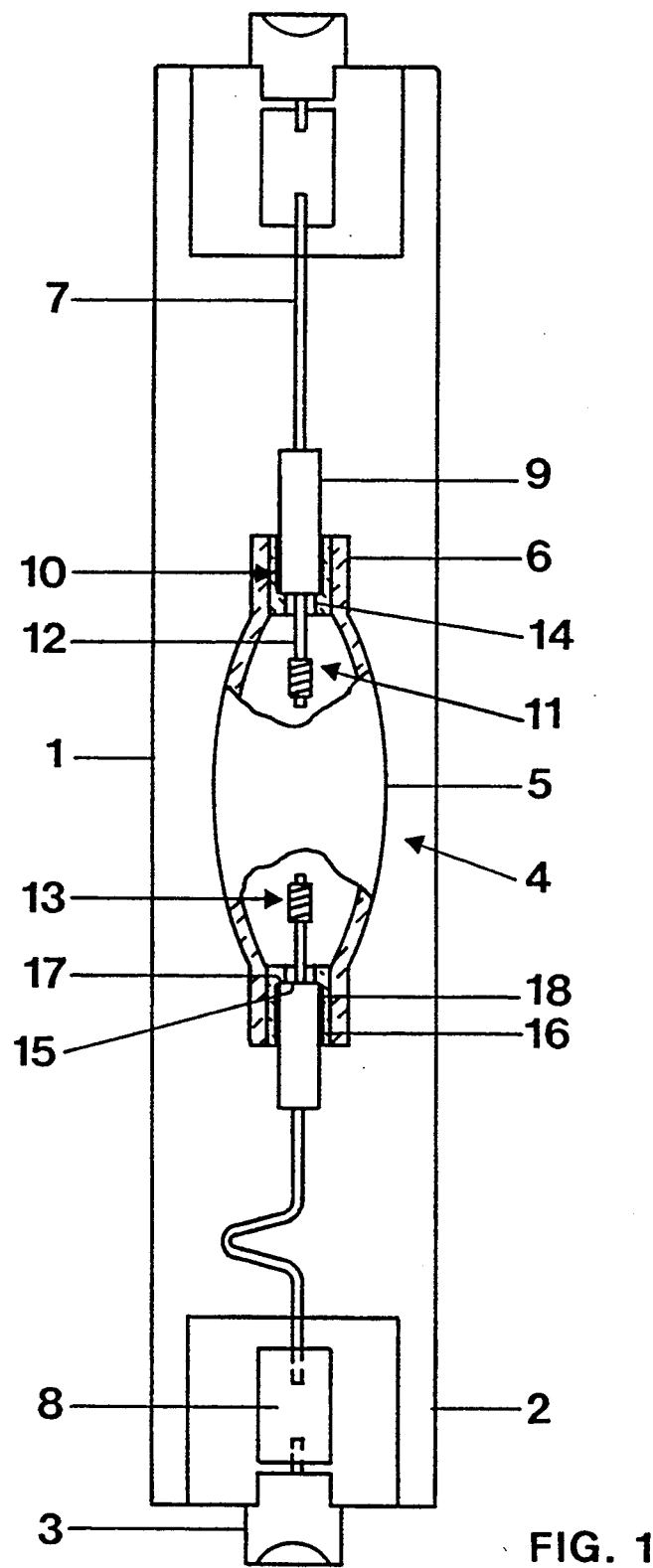
FIG. 1 is a side view of a double-ended, double-based metal-halide discharge lamp, in which portions adjacent the ends of the discharge vessel are shown in section.

For purposes of illustration, FIG. 1 shows a metal-halide discharge lamp of 150 W rated power. A cylindrical outer envelope 1, defining a lamp axis, and made of quartz glass, is formed with two bases 3, just outside of pinch-sealed ends 2. A discharge vessel 4 is axially located within the outer envelope 1. It is made of $Al_2O_3$ ceramic, bulged out in the center 5 to have an essentially barrel shape, and has two cylindrical ends 6. Two current supply leads 7 are connected to the bases 3 through conductive foils 8, typically molybdenum foils, within the pinch seals 2 of the outer envelope 1. The current supply leads 7 are welded to tubular connecting leads 9, which are fitted, respectively, in ceramic plugs 10, also made of $Al_2O_3$, and fitted in the ends of the discharge vessel 4.

The tubular connections or leads 9 are made of niobium or tantalum, and retain electrodes 11 at their inner ends. The electrodes 11 have an electrode shaft 12 of tungsten and a closely wrapped winding 13 fitted on the tungsten stem or shaft 12. The discharge vessel retains a fill which, besides an inert ignition gas such as argon, includes mercury and additives of metal halides.

The tubular lead-throughs 9 are deep-drawn or extruded. They are seated, recessed, in a bore 14 of the end plugs 10. At the discharge end or inner end, the tubes 9 have a flat bottom 15 on which the electrode shaft 12 is butt-welded.

Figure 2:
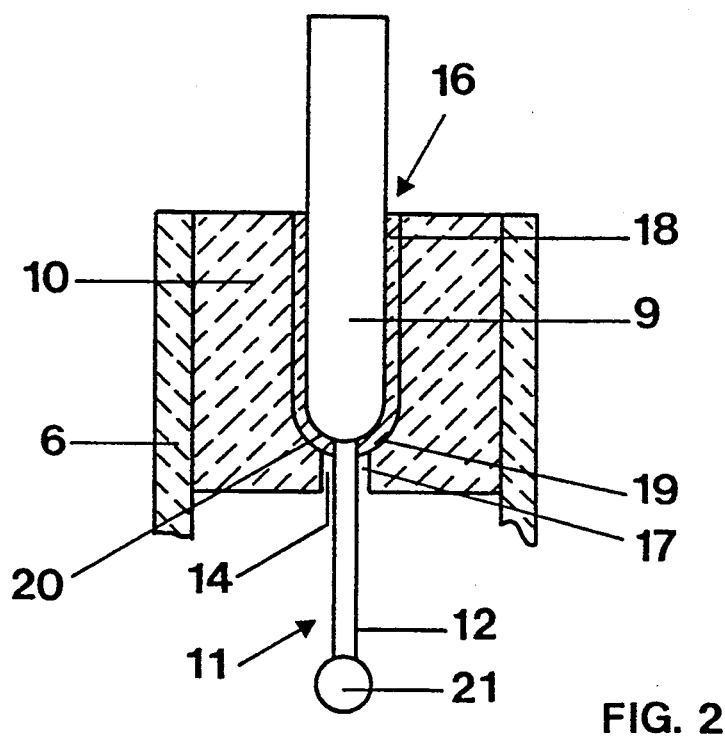
FIG. 2 is a sectional view to a scale enlarged with respect to that of FIG. 1, of the region of the plug fitting into an end portion of the discharge vessel.
Figure 3:
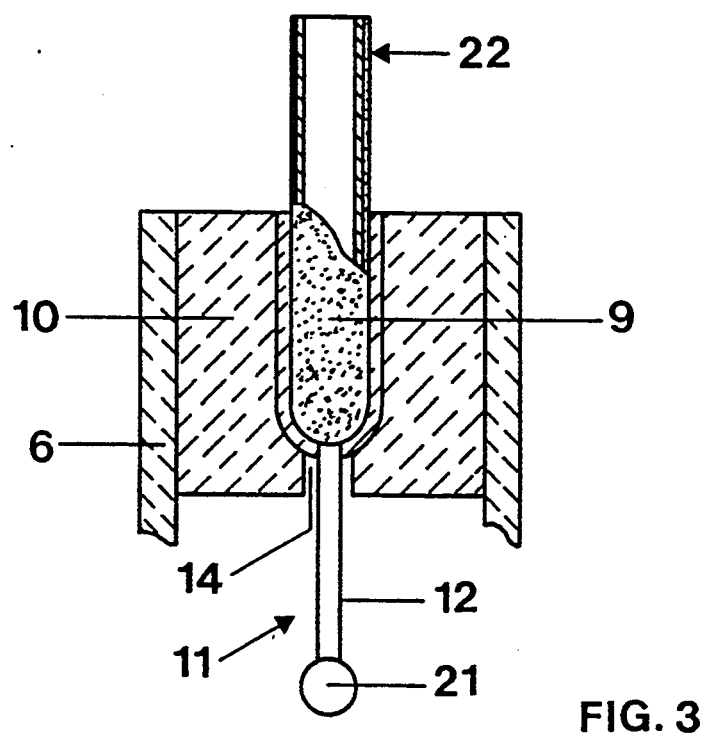
FIG. 3 illustrates another embodiment of the melt region of the connection into the discharge vessel.

In accordance with a feature of the invention, the through-opening or bore 14 has two parts or portions, each of which are of effectively constant diameter essentially throughout their axial lengths (see FIGS. 1-3). The first part or portion, remote from the discharge space of the discharge vessel 5 and forming the outer part or portion 16, is matched to the outside diameter of the niobium tube 9. In contrast, the second or inner part or portion 17 is constricted or narrowed with respect to the portion 16. The two portions 16, 17 adjoin each other in stepped form, the bottom 15 of the tube engaging the step or abutment formed thereby between the two portions 16, 17.

The diameters of the two portions 16, 17 are specifically selected. The diameter of the second portion 17 is selected to be so wide or so great that, upon assembly, the electrode shaft 12 including the wrapped winding 13 can be introduced through the opening 14 in the plug 10.

The tube 9 is sealed in the first portion 16 by a halide-resistant melt glass 18 to be gas-tightly retained and sealed in the plug 10. Known materials, for example a mixture of aluminum and alkaline earth oxides, are suitable for the melt or sealing glass 18. Particularly suitable materials which are halide-resistant are described in the referenced U.S. Pat. Nos. 4,501,799, Driessen et al, and 4,740,403, Oomen et al.

FIGS. 2 and 3 illustrate particularly preferred embodiments. The region of the lead-through at one end 6 of the discharge vessel is shown to an enlarged scale. The discharge vessel, at the end portion 6, has a wall thickness of about 1.2 mm. The cylindrical plug 10 is fitted into the end 6. Its outer diameter is about 3.3 mm; its axial length or height is 5 mm. The axial through-opening or bore 14 has a first outer portion 16 with an axially constant diameter of 2 mm, and a second constricted inner portion 17 with an axially constant diameter of 0.8 mm. The length of the portion 16 is approximately two-thirds of the height or length of the plug 10; the remaining third is taken up by the second portion 17.

The niobium tube 9, which extends externally beyond the plug 10, has an outer diameter of 1.95 mm, so that the gap remaining for the melt glass or sealing glass has a width of 0.025 mm. The wall thickness of the niobium 9 is 0.2 mm. The diameter of the electrode shaft or stem 12, butt-welded to the dome-shaped end of tube 9, is 0.5 mm, so that the difference between the inner portion 17 of the through-opening 14 and the electrode shaft 12 is 0.3 mm.

The transition between the two portions 16 and 17 is concave and rounded, as seen at 19 in FIG. 2. The discharge end of the tube likewise is closed off by a hemispherical rounded dome 20. The two rounded portions 19 and 20 are matched together, so that the width of the remaining gap, forming a capillary, between the tube and the first portion 16 will be retained generally also in the region of the concave rounded portion 19 and the dome 20. Thus, the sealing glass 18 will wet not only the gap in the axial portion of the first part or portion 16, but also the dome-shaped end of the tube 20 up to where the electrode shaft 12 extends from the dome-shaped end 20.

The diameter of the second portion 17 of the aperture 14 is selected to be so small that, upon assembly, only the electrode shaft can be inserted through the bore 14. This ensures an almost complete wetting of the surface of the tube 9, especially around the shaft 12. The essentially ball-shaped terminal end 21 on the shaft 12 of the electrode 11 is formed only afterwards within the electrode vessel by application of excess current.

The arrangement illustrated in FIG. 2 can be further improved, as shown in FIG. 3. In essence, the same general arrangement is used and identical elements have been given the same reference numerals. The niobium tube 9, in accordance with this embodiment, is coated with a layer of $Al_2O_3$ ceramic 22 which, as described, may have an additive of $Y_2O_3$. The thickness of the coating is about 0.2 mm. Consequently, the diameter of the portion 16 of the bore 14 in the plug 10 is increased to 2.4 mm. The sealing glass, when using this embodiment, has been found to wet the niobium tube in a particularly uniform and complete manner.

Various changes and modifications may be made and any features described herein with respect to any one embodiment may be used with any others, within the scope of the inventive concept.

We claim:

1. High-pressure discharge lamp having
a ceramic discharge vessel (4) of aluminum oxide, defining two apertured ends (6);
an ionizable fill within the vessel;
electrodes (11) having an electrode stem (12) in the vessel;
a ceramic plug (10) in at least one end of the vessel and closing off the vessel, said plug being formed with a through-opening (14) and said plug further defining an inner end facing the discharge vessel and an outer end remote from said inner end;
an electrically conductive tube (9) of a material having a thermal coefficient of expansion at least generally similar to the thermal coefficient of expansion of the ceramic material of the plug, electrically connected to the electrode stem (12) and adapted for connection to an external connecting lead (7), wherein, in accordance with the invention,
the through-opening (14) through the plug comprises two portions (16, 17) of different diameter, each of which is of effectively constant diameter throughout the length of the respective portion,
in which the diameter of the portion (16) adjacent the outer end of the plug, defining an outer portion, is dimensioned to match the outside diameter Of the electrically conductive tube (9),
in which the diameter of the portion (17) adjacent the inner end of the plug, and defining an inner portion, is smaller than the diameter of the outer portion (16) and dimensioned to permit free passage of the electrode stem (12) with sufficient clearance to permit thermal expansion of the electrode stem in operation of the lamp; and
a sealing glass (18) melt-sealing the electrically conductive tube (9) in the outer portion (16) of the through-opening (14) in the plug (10).

2. The lamp of claim 1, wherein said electrically conductive tube comprises niobium or tantalum.

3. The lamp of claim 1, wherein the length of the outer portion (16) of the through-opening (14) is approximately two-thirds of the overall length of the plug (10).

4. The lamp of claim 1, wherein the diameter of the outer portion (16) of the through-opening (14) and the outside diameter of the electrically conductive tube (9) differ by up to about 0.05 mm.

5. The lamp of claim 1, wherein the diameter of the inner portion (17) of the through-opening (14) and the diameter of the stem (12) of the electrode (11) differ by at least 0.5 mm.

6. The lamp of claim 1, wherein said two portions (16, 17) of the through-opening define a transition region between the respective different diameters;
the electrically conductive tube (9) terminates at the transition region of the outer portion (16) of the through-opening in a generally hemispherical dome (20); and
wherein said transition region is rounded (19) with a radius and shape matching, at least approximately, the radius and shape of said dome (20).

7. The lamp of claim 1, further including an $Al_2O_3$ layer (22) covering the outside of said electrically conductive tube (9) at least within the region of overlap between said tube and the outer portion (16) of the through-opening (14).

8. The lamp of claim 7, wherein said layer of $Al_2O_3$ includes, additionally, $Y_2O_3$.

9. The lamp of claim 1, wherein both ends (6) of said discharge vessel are closed by identical ceramic plugs (10), and electrically conductive tubes (9) extend into identical through-openings (14) in said plugs and are melt-sealed by said sealing glass in the outer portions (16) of the through-openings (14) of said plugs.

10. The lamp of claim 1, wherein said electrodes (11) have enlarged electrode ends (13); and
wherein said inner portion (17) of the through-opening (14) has a diameter large enough to permit passage of said enlarged ends through said inner portion of the through-opening.

11. The lamp of claim 1, wherein said electrodes have enlarged ends (13, 21) at the portions thereof inside of said vessel; and
wherein the diameter of the inner portion (17) of the through-opening (14) is smaller than the diameter of said enlarged ends.

12. The lamp of claim 1, wherein said electrically conductive tube terminates in a bottom (15, 20), and said electrode stem (12) is butt-welded to said bottom.

13. The lamp of claim 1, wherein said two portions (16, 17) of the through-opening define a transition region between the respective different diameters; and
wherein said transition region forms a seating abutment for the bottom (15, 20) of said electrically conductive tube, and is shaped and dimensioned similar to the shape and dimension of said bottom (15, 20) of the tube to receive said bottom, while leaving a capillary space for ingress of molten sealing glass between said bottom and said transition region.

14. The lamp of claim 1, wherein the inner diameter of the outer portion (16) of the through-opening (14) and the outside diameter of the tube (9) differ by a distance forming a capillary space for flow of said sealing glass melt-sealing the tube (9) in the outer portion (16) of the through-opening when said sealing glass is in molten, flowing condition.

15. The lamp of claim 1, wherein the diameter of the inner portion (17) of the through-opening (14) and the diameter of the stem (12) of the electrode (11) differ by at least 0.3 mm.

16. The lamp of claim 11, wherein the diameter of the inner portion (17) of the through-opening (14) and the diameter of the stem (12) of the electrode (11) differ by at least 0.3 mm.

17. The lamp of claim 6, wherein the diameter of the inner portion (17) of the through-opening (14) and the diameter of the stem (12) of the electrode (11) differ by at least 0.5 mm.

18. The lamp of claim 6, wherein the diameter of the inner portion (17) of the through-opening (14) and the diameter of the stem (12) of the electrode (11) differ by at least 0.3 mm.

19. The lamp of claim 6, wherein said two portions (16, 17) of the through-opening define a transition region between the respective different diameters;
wherein said transition region forms a seating abutment for the bottom (15, 20) of said electrically conductive tube, and is shaped and dimensioned similar to the shape and dimension of said bottom (15, 20) of the tube to receive said bottom, while leaving a capillary space for ingress of molten sealing glass between said bottom and said transition region; and wherein the diameter of the inner portion (17) of the through-opening (14) and the diameter of the stem (12) of the electrode (11) differ by at least 0.5 mm.

20. The lamp of claim 6, wherein said two portions (16, 17) of the through-opening define a transition region between the respective different diameters;

wherein said transition region forms a seating abutment for the bottom (15, 20) of said electrically conductive tube, and is shaped and dimensioned similar to the shape and dimension of said bottom (15, 20) of the tube to receive said bottom, while leaving a capillary space for ingress of molten sealing glass between said bottom and said transition region; and wherein the diameter of the inner portion (17) of the through-opening (14) and the diameter of the stem (12) of the electrode (11) differ by at least 0.3 mm.

* * * * *